United States Patent [19]

Gerber

[11] Patent Number: 4,558,420
[45] Date of Patent: Dec. 10, 1985

[54] COMPUTER GENERATED MOLD FOR CONTOURED GARMENT PIECE FORMATION

[75] Inventor: Heinz J. Gerber, West Hartford, Conn.

[73] Assignee: Gerber Scientific Inc., South Windsor, Conn.

[21] Appl. No.: 436,701

[22] Filed: Oct. 25, 1982

[51] Int. Cl.⁴ .................. G06F 15/46; G05B 19/42
[52] U.S. Cl. ............................ 364/476; 318/568; 318/578; 364/474; 364/513; 364/520
[58] Field of Search ............ 364/468, 470, 520, 513, 364/474, 475, 191–193, 476; 318/568, 162, 578; 901/6–10, 41, 50; 33/2 R, 4–6, 11, 17 R; 83/925 CC; 409/121, 127

[56] References Cited

U.S. PATENT DOCUMENTS

| | | | |
|---|---|---|---|
| 3,559,021 | 1/1971 | Bingham, Jr. | 318/568 |
| 3,613,501 | 10/1971 | Sanders | 318/162 X |
| 4,149,246 | 4/1979 | Goldman | 364/900 |
| 4,393,450 | 7/1983 | Jerard | 364/475 X |
| 4,430,718 | 2/1984 | Hendren | 364/191 X |
| 4,449,699 | 5/1984 | Ashizawa et al. | 318/578 X |

OTHER PUBLICATIONS

Staley et al.–"Computer-Aided Design of Curved Surfaces with Automatic Model Generation"–ASME Publication–Presented at Design Engineering Conference & Show, Chicago, Ill.–Mar. 1980, pp. 1–9.

Primary Examiner—Joseph Ruggiero

[57] ABSTRACT

Three dimensional garment pieces are formed with a computer generated mold produced from pregathered numerical data describing the object or person to be clothed.

7 Claims, 2 Drawing Figures

COMPUTER GENERATED MOLD FOR CONTOURED GARMENT PIECE FORMATION

SUMMARY OF THE INVENTION

This invention relates to the formation of garment pieces in a three dimensional mold, and deals more particularly with a system for generating the mold from an object or person to be fitted.

An important object of the present invention is to provide a system for the generation of a three dimensional mold from discrete surface areas of a three dimensional object to be fitted with a garment consisting of fewer pieces than heretofore possible with conventional garment patterns of two dimensional configurations.

In carrying out this process in accordance with the present invention a first multi-axis robotic manipulator is programmed to cause a transducer to traverse the applicable surface area of the object and to record the three dimensional contour data in the memory of a digital computer. A second robotic manipulator has a cutting tool which is brought into contact with a block of suitable material for sculpting either a reproduction of that surface contour, or its negative, to provide a three dimensional block dictated by the stored data. This shaped block is utilized either as the mold itself, or to generate a suitable mold where a three dimensional pattern piece can be created under suitable conditions of temperature and pressure, with optional supplementary flocking to achieve the desired physical characteristics of the synthetic 3D pattern piece. Other pieces are similarly formed, and these pieces are joined by welding or ultrasonic joining to produce a garment of fewer pattern pieces than permitted by the present day approach utilizing two dimensional pattern pieces produced for the garment industry on state of the art cutters, graders, markers, and automatic and semi-automatic sewing machines.

DETAILED DESCRIPTION

Figure 1:
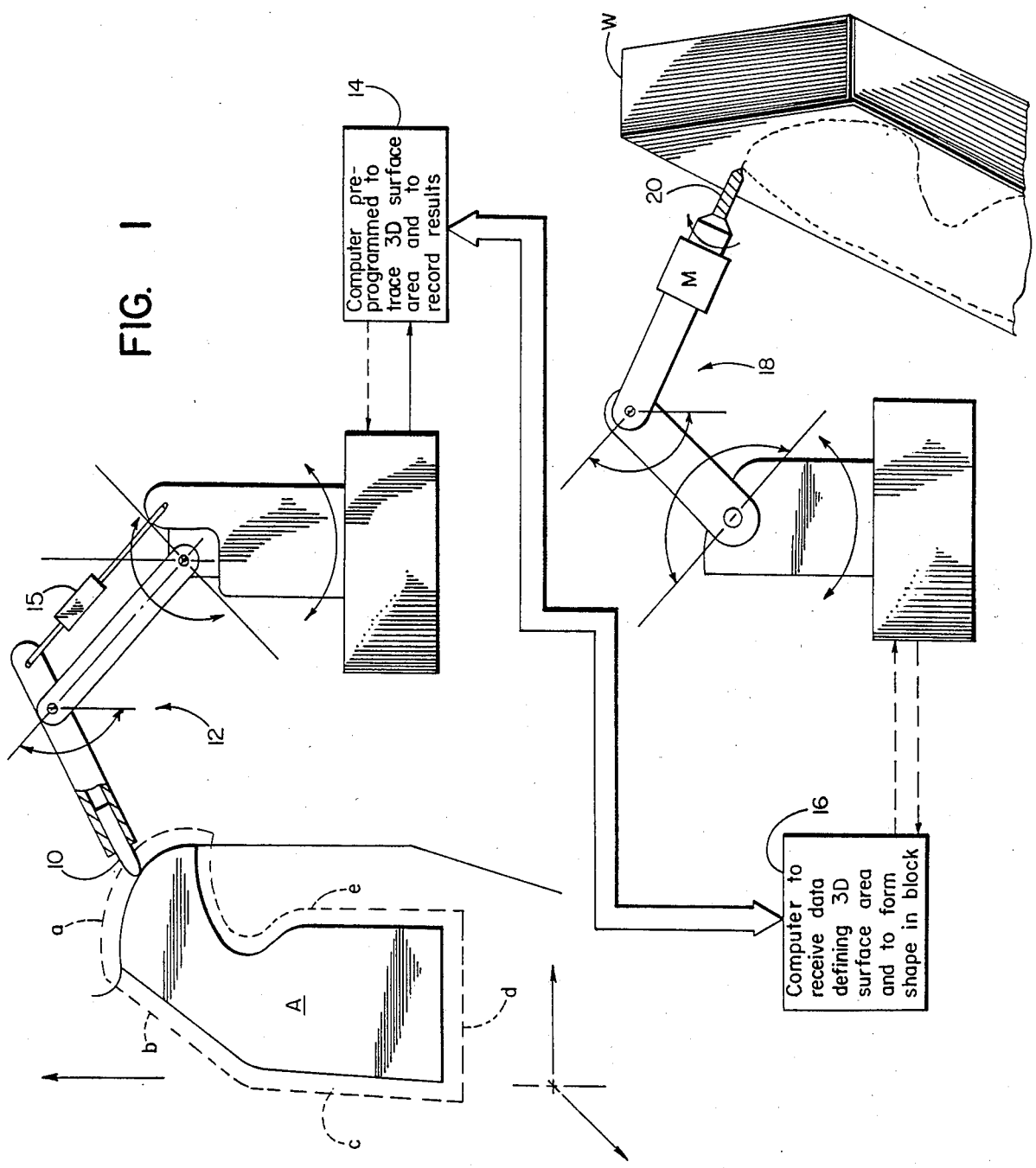
FIG. 1 is a schematic view of a system for tracing the three dimensional surface of the front left area of a person's upper body to generate the data necessary for forming or shaping a mold in the same three dimensional shape.

Turning now to the drawings in greater detail, and referring particularly to FIG. 1, a person or other object to be fitted with a garment is positioned so that a sensor or proximity transducer 10, provided on a robotic manipulator arm 12, can be programmed by computer 14 to traverse the applicable surface area A of the object and thereby generate three dimensional data indicative of the contour of this area A. The disclosure in U.S. Pat. No. 4,163,183 may be referred to for one possible type of robotic device designed to sense the position of a stylus or tool. Such a device is adapted to provide the necessary position data for the memory of a conventional computer which would, of course, be suitably pre-programmed for scanning the area A in a teaching mode prior to the generation of actual data, as taught in said patent. This U.S. patent and U.S. Pat. No. 4,338,672 are incorporated by reference herein, but other state of the art robotic control systems might also be adapted for generating the digital data required to record the particular contour shape in the memory of a computer for recall later. If desired, device 12 may include displacement transducer means 15 associated with one of the links or arms to yield at a preprogrammed force without upsetting the data recorded. See U.S. Pat. No. 4,076,131 for a detailed disclosure of such a redundant tracing system.

Still with reference to FIG. 1, the above described computer 14, or preferably another such unit 16 coupled thereto, is adapted to receive this data defining the three dimensional surface area A and to operate a second manipulator arm of robotic device 18 so that a cutting tool 20 can be moved under the control of computer 16 to shape a block or workpiece W and form a positive, or negative image, of the surface A. If the block W is of suitable material for mold use the very surface so shaped can be used as the mold, or alternatively to generate a mold if an intermediate step or steps should be required for any reason.

Figure 2:
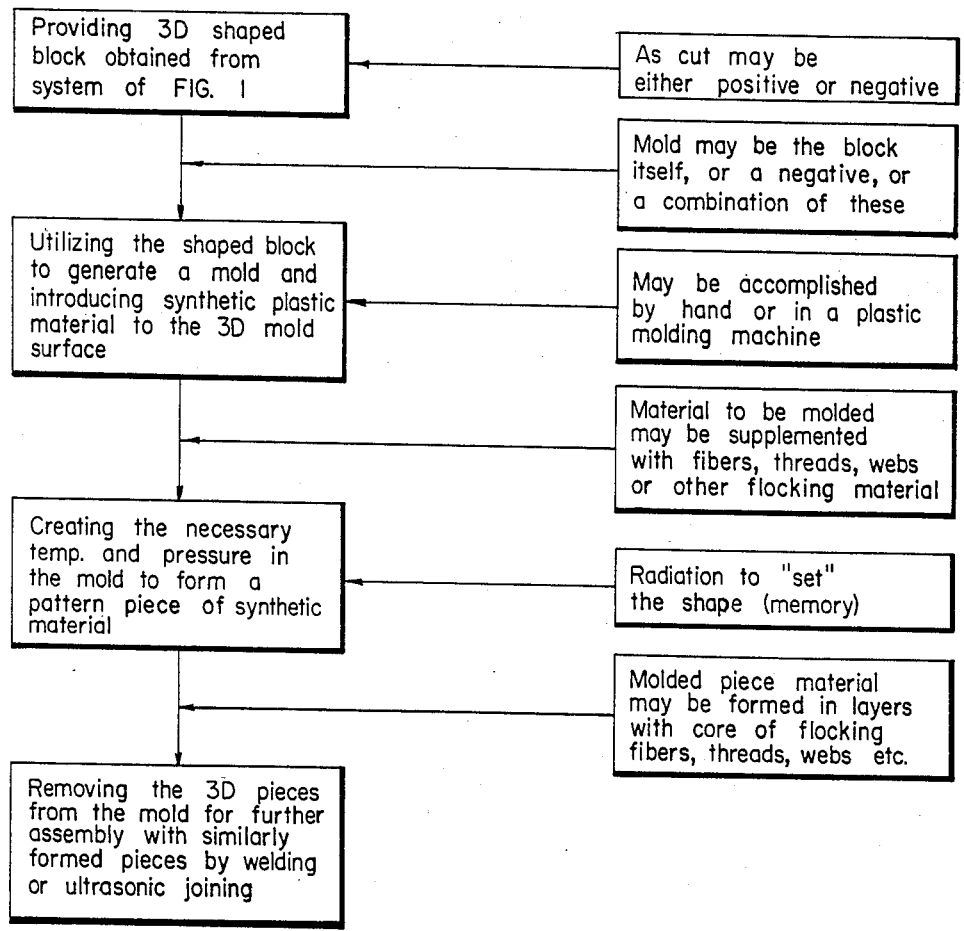
FIG. 2 is a flow chart illustrating a system for molding a garment from pieces formed by several molds all of which are generated as a result of utilizing the system of FIG. 1.

Turning next to the schematic view of FIG. 2, once the mold has been so prepared, the next step is to introduce the synthetic plastic material, either by hand, or automatically, as by injection if a two part mold is utilized. In order to best realize the advantages of my invention I prefer to place at least one layer of synthetic fabric in the mold and to supplement this with fibers, threads, or other flocking material, with or without a further fabric layer, prior to creating the necessary temperature and pressure in the mold to form the three dimensional pattern piece. As suggested in FIG. 1, the total size of the piece will include selvedge portions a, b, c, d, and e which provide marginal portions to faciliate joining several pieces such as that shown at A in FIG. 1 to form a garment from these uniquely formed pattern pieces.

If desired the plastic material may be radiated to give it a memory or "set" so that the garment will tend to return to some predetermined configuration after periods of use by the wearer. The material used for producing the molded pieces of the present invention may include electrically conductive threads arranged in predetermined patterns to serve any number of functions. For example, implanted pacemakers, insulin pumps, and artificial organs generally may benefit from the resulting shielding and isolation from spurious electromagnetic fields so prevalent in today's environment. Such metal threads can also facilitate an electroplating step in the garment production process of FIG. 2 where the designer seeks to emboss or otherwise embellish particular areas of the finished garment. Such a metal "base" can be rendered luminescent for night safety in the production of work clothing for example. The insulating and moisture absorption characteristics of the garment can be readily varied depending upon the ultimate use of the garment.

Finally, the fact that plastics can be provided with a memory or "set" permits the garment to be individually sized to the customer's shape. After molding the various pieces, produced as described above, the completed garment can be subject to the heat or radiation necessary to permanently "set" the complete garment to hold its size dimensions. This can be done on an adjustable mold with segments movable to simulate standard or customized sizes. Computer controlled devices move the segments for this purpose and if this option is utilized in a system in accordance with the present invention the shape "set" shown in the molding step of FIG. 2 would be omitted in favor of a final step as described in this paragraph.

I claim:

1. A process for the manufacture of garments from shaped three dimensional pattern pieces and comprising the steps of
    (a) holding the subject to be fitted stationary in the proximity of a robotic device including a manipulator arm,
    (b) providing a proximity sensing transducer in the manipulator arm, which transducer is capable of generating a signal to a computer when the transducer has been brought into close proximity to the subject to be fitted with a garment,
    (c) causing the manipulator arm to move the transducer in a predetermined pattern and under the direction of a preprogrammed computer to record in the computer's memory digital data indicative of the three dimensional shape of the object in a predetermined area,
    (d) providing a workpiece block in the vicinity of a second manipulator arm associated with a computer adapted to process said data defining the three dimensional shape,
    (e) providing a workpiece shaping tool on said second manipulator arm,
    (f) shaping the workpiece block to provide a three dimensional suface corresponding to said three dimensional shape,
    (g) molding a synthetic plastic piece in a mold made from said three dimensional surface to provide a garment pattern piece.

2. The process of claim 1 further characterized by the additional steps of forming further pattern pieces by following the above steps, and joining said pieces to provide a garment therefrom.

3. The process of claim 1 further characterized by flocking said plastic in the mold to impart one or more physical characteristics to the garment pattern piece not present in the plastic itself.

4. A process for the manufacture of garments or the like from three dimensionally molded pattern pieces and comprising;
    (a) tracing a three dimensional object or person to be fitted in a predetermined pattern with movable transducer means to generate a data bank defining said object or person's three dimensional shape,
    (b) processing the data of said bank in a computer which has been programmed to direct a workpiece shaping tool,
    (c) shaping a workpiece with said shaping tool under the direction of said computer to provide a three dimensional surface corresponding to a predetermined area of said object or person, and
    (d) molding a garment piece using said shaped workpiece.

5. The process of claim 4 further characterized by
    (e) repeating steps (b) and (c) to provide several shaped workpieces, and
    (f) molding at least one garment piece from each of said shaped workpieces.

6. The process of claim 5 further characterized by joining said pieces to form a complete garment or garment subassembly.

7. The process of claim 5 further characterized by using a plastic material on said shaped workpiece to provide said molded garment piece and flocking said plastic material to impart one or more physical characteristics to the garment piece not present in the plastic itself.

* * * * *